(12) United States Patent
Delvaux et al.

(10) Patent No.: US 6,255,883 B1
(45) Date of Patent: Jul. 3, 2001

(54) SYSTEM AND METHOD FOR BALANCING CLOCK DISTRIBUTION BETWEEN TWO DEVICES

(75) Inventors: Marc Delvaux; Ronen Habot, both of Eatontown, NJ (US)

(73) Assignee: Globespan, Inc., Red Bank, NJ (US)

( * ) Notice: Subject to any disclaimer, the term of this patent is extended or adjusted under 35 U.S.C. 154(b) by 0 days.

(21) Appl. No.: 09/411,991

(22) Filed: Oct. 4, 1999

Related U.S. Application Data

(60) Provisional application No. 60/111,534, filed on Dec. 9, 1998.

(51) Int. Cl.[7] .................................................. H03L 3/00
(52) U.S. Cl. ............................................. 327/291; 326/30
(58) Field of Search .................................. 327/141, 161, 327/564, 565, 261, 263, 264, 291, 292, 299; 326/30, 41, 47, 83, 86

(56) References Cited

U.S. PATENT DOCUMENTS

| | | | |
|---|---|---|---|
| 5,384,808 | * | 1/1995 | Van Brunt et al. ..................... 375/36 |
| 5,581,201 | * | 12/1996 | Sonner et al. ......................... 326/56 |
| 5,864,584 | * | 1/1999 | Cao et al. ............................ 375/244 |
| 5,872,471 | * | 2/1999 | Ishibashi et al. .................... 327/987 |
| 6,046,653 | * | 4/2000 | Yamada ................................. 333/32 |
| 6,049,221 | * | 4/2000 | Ishibashi et al. ..................... 326/30 |
| 6,051,989 | * | 4/2000 | Walck ................................... 326/30 |
| 6,124,756 | * | 9/2000 | Yaklin et al. ........................ 327/564 |

* cited by examiner

Primary Examiner—My-Trang Nuton
(74) Attorney, Agent, or Firm—Thomas, Kayden, Horstemeyer & Risley

(57) ABSTRACT

In general, the system and method provides a balanced clock distribution between two devices. A first output buffer, located in a source chip, provides buffering of a clock signal, after which, the delayed clock signal is transmitted to a destination chip, as well as to a balancing buffer located in the source chip. In addition, a second buffer, also located in the source chip, provides buffering of a data signal, after which, the data signal is transmitted to the destination chip. Both the clock and the data signals are then further buffered by first and second input buffers respectfully, which are located on the destination chip. After the delayed clock signal has been received by the balancing buffer, the balancing buffer provides a balancing delay to the delayed clock signal in accordance with the delay provided by the first input buffer, located in the destination chip, so as to provide a balanced clock distribution between the source chip and the destination chip. This balanced clock signal is then transmitted to portions of the source chip, for use by particular modules in the source chip which require a clock signal.

19 Claims, 2 Drawing Sheets

SYSTEM AND METHOD FOR BALANCING CLOCK DISTRIBUTION BETWEEN TWO DEVICES

CROSS-REFERENCE TO RELATED APPLICATIONS

This application claims the benefit of U.S. Provisional Application Ser. No. 60/111,534, filed on Dec. 9, 1998, and entitled "Balanced Clock Distribution Between Two Separate Devices," which is incorporated by reference herein in its entirety.

FIELD OF THE INVENTION

The present invention generally relates to integrated circuit design. More specifically, the invention is related to a system and method for balancing clock distribution between two integrated circuits.

BACKGROUND OF THE INVENTION

Present circuit design utilizes a plurality of integrated circuits, or chips, which receive a clock signal from a single clock-signal producing device. These chips are usually required to operate at high frequencies. As such, a system which incorporates a plurality of such chips usually requires that each chip operate in synchronism with the clock-signal producing device, which may be located internal or external to the system. It is well known that to correctly detect a data signal from one chip to another, the receiving chip must have at its disposal a clock signal that is closely synchronized with the incoming digital data stream, so as to be able to evaluate logic levels at the most favorable instance. However, not always is the data signal transmitted with an associated clock signal at the same time, in particular, when transmission is performed singularly on a single line.

Generally, it is desirable for all chips using the same clock signal derived from a source chip, to experience a skew of the clock signal which is the same as the skew experienced by the clock signal used by the source chip. However, currently, when a clock signal, derived from a source chip which produces the clock signal, is sent to another chip, or a destination chip(s), the clock signal is first buffered by an output buffer located on the source chip, which drives the clock signal to the destination chip. The output buffer typically adds a delay of a few nanoseconds to the time of propagation for the clock signal to reach the destination chip from the source chip. Typically, the delay is dependent upon the physical load on the buffer, such that, if the clock signal is being distributed to multiple chips, the delay is larger than if the clock signal is distributed to a single chip. The geometric aspects of using a single output buffer to drive the clock signal involves insuring that a low skew of the clock single is fed to all modules on the destination chip.

Generally, data and the clock signal are both created on the same source chip. Thereafter, both the data signal and the clock signal are transmitted to separate output buffers for buffering before being transmitted to the destination chip. Preferably the delay provided by the output buffers is equivalent.

While the data and clock signals are transmitted to a destination chip, which uses the clock signal for, among other functions, data sampling, the original clock signal, before being delayed by the output buffer, is used by the source chip for multiple known purposes, which may include such things as defining a rate at which data is produced.

In addition to the delay provided by the output buffer used by the source chip, the destination chip typically comprises an input buffer that provides further delay to the already delayed clock signal. Once again, the destination chip typically comprises separate input buffers, specifically, one for the data input and one for the clock signal input.

Since the internal clock, as originated, is skewed with respect to the clock signal received by the destination chip, problems may occur in the preparation of data for the next clock cycle. These problems are largely attributed to the delays associated with the output buffer in the source chip and the input buffer in the destination chip. As an example, in a high rate system, if the source chip uses the clock signal for the preparation of data to be transmitted to the destination chip, and the clock signal is delayed by the output buffer before being received by the destination chip, where the clock signal is further delayed by the input buffer, data may change in the source chip before being received by the destination chip, thereby preventing the destination chip from receiving all data from the source chip. Therefore, the data created by the source chip must be held for a period while the clock signal travels to the point of storage. This hold time relates to the delay between the clock input to a register and storage element located in the destination chip.

In order to synchronize the source clock signal with the clock signal received by the destination chip, after being buffered by the output and input buffers, present circuits control their internal clock signals by means of a clock signal generator circuit using a phase locked loop (PLL) circuit. This PLL circuit makes use of a delay line loop (DLL) system that uses a delay line circuit in an oscillator to delay a reference clock signal by one cycle to synchronize with a rising edge of a following clock cycle, thereby synchronizing the clock signal of the source chip to the clock signal received by the destination chip.

While PLLs have been used to regenerate clocks from data, PLLs are presently used to aid system clocking issues. This has occurred because the on-line chip clock frequencies have increased to the point where having to allow for small skews, at the board level, can decrease the overall speed of the system dramatically. The PLL allows an internal clock to be generated that is in phase with an externally delivered clock.

Unfortunately, a PLL consists of a phase detector, a charge pump, a loop filter, and a voltage controlled oscillator, all which add to the circuitry of a chip, and therefore, the cost of manufacturing a chip having a PLL.

Therefore, there is a need in the art for less expensive and more efficient systems and methods for balancing clock distribution between two chips.

SUMMARY OF THE INVENTION

Briefly described, the invention is a system and method for providing a balanced clock distribution between two chips. The invention eliminates the need for using excess circuitry in providing for this balanced distribution. This is performed by using a balancing buffer, in addition to a first output buffer, located on a source chip, and a first input buffer, located on a destination chip. The balancing buffer provides a clock signal delay that is equivalent to a clock signal delay provided by the first input buffer located in the destination chip, as well as providing unigain amplification of the received clock signal from the source chip. This clock signal delay is provided after an initial delay is received by the first output buffer.

After buffering of the clock signal is provided by the first output buffer, located in the source chip, the delayed clock signal is transmitted to the destination chip, as well as to the balancing buffer located in the source chip. In addition, after buffering of a data signal is provided by a second output buffer, located in the source chip, the data signal is transmitted to the destination chip. Both the clock and the data signals are then further buffered by first and second input buffers respectfully, which are located on the destination chip.

After the delayed clock signal has been received by the balancing buffer, the balancing buffer provides a balancing delay to the delayed clock signal in accordance with the delay provided by the first input buffer, located in the destination chip, so as to provide a balanced clock distribution between the source chip and the destination chip. This balanced clock signal is then transmitted to portions of the source chip, for use by particular modules in the source chip which require a clock signal.

The invention has numerous advantages, a few of which are delineated hereafter as examples. Note that the embodiments of the invention, which are described herein, possess one or more, but not necessarily all, of the advantages set out hereafter.

One advantage of the invention is that it provides for a balanced clock distribution between a source chip and a destination chip, without the need for using excess circuitry.

Another advantage is that it provides a balanced clock distribution between a source chip and a destination chip, while advantageously using the delay received from an output buffer located within the source chip.

Another advantage is that, due to its limited need of additional circuitry, the invention may be implemented on each chip in a system that generates a clock signal, with the addition of minimal cost.

Other features and advantages of the present invention will become apparent to one of reasonable skill in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiments of the invention, which however, should not be taken to limit the invention to the specific embodiments, but are for explanation and for better understanding. Furthermore, the drawings are not necessarily to scale, emphasis instead being placed upon clearly illustrating the principles of the invention. Finally, like referenced numerals in the figures designate corresponding parts throughout the several drawings.

DESCRIPTION OF THE PREFERRED EMBODIMENT

Figure 1:
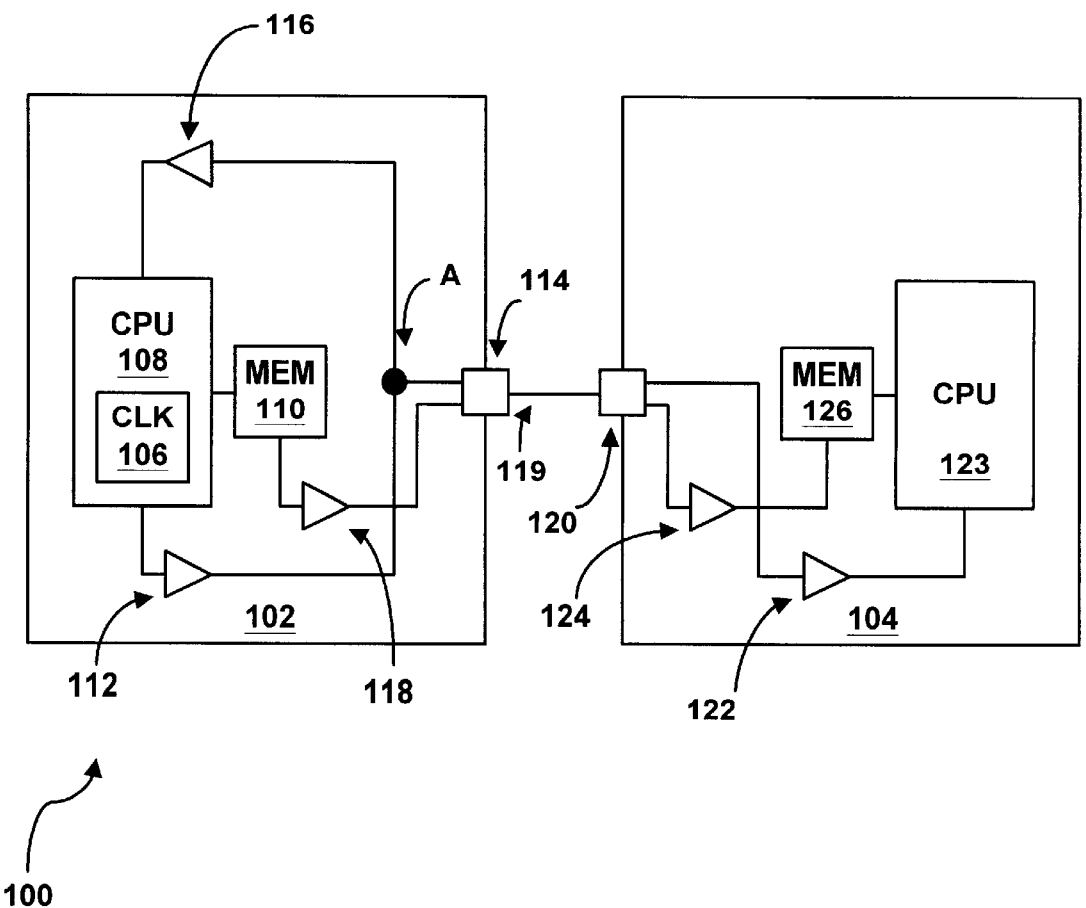
FIG. 1 illustrates the balanced clock distribution system located on a source device, which compensates for clock signal delay recognized by a destination device.

Referring now to the drawings, wherein like referenced numerals designate corresponding parts throughout the drawings, FIG. 1 illustrates a balanced clock distribution system 100 in accordance with the preferred embodiment of the invention. As illustrated, the balanced clock distribution system 100 comprises a source chip 102 and a destination chip 104. It should be noted that while the following description refers to a source chip 102 which creates a clock signal for use by the source chip 102 and the destination chip 104, one of reasonable skill in the art will understand that the clock signal need not be derived from the source chip 102, but may instead be received from such devices as, but not limited to, an external clock signal generator or an internal clock signal generator located elsewhere on a printed circuit board (PCB) on which the balanced clock distribution system 100 is located. It should also be noted that while the present disclosure describes the system 100 with reference to chips, one of reasonable skill in the art will appreciate that any modules located on a PCB, having a CPU and memory, may be used.

In accordance with the preferred embodiment of the invention, the source chip 102, using an internal clock 106 located within a CPU 108, generates a clock signal for transmission to the destination chip 104 for purposes of, among other known purposes, data sampling. In addition, the source chip 102 derives data for transmission, from a memory element 110, to the destination chip 104. It should be noted that the source chip 102 need not be the source of the data, but may instead merely be providing for transmission of the data, which instead may originate from an external state machine, or other data producing device, to be delivered to the destination chip 104. Further, there may be more that one destination for the clock signal.

Before transmission of the clock signal to the destination chip 104, a first output buffer 112 is used by the source chip 102 to drive the clock signal. The clock signal incurs a delay from the first output buffer 112, thereby creating a delayed clock signal. The delayed clock signal is then transmitted to point A, wherein the delayed clock signal is transmitted to a first pad 114, as well as to a balancing buffer 116. As known by one of reasonable skill in the art, the pad 114 may be created by such means as soldering to the printed circuit board, and simply provides a connection from the source chip 102 to a PCB route.

Also, before transmission of data to the destination chip 104, a second output buffer 118 is used by the source chip 102 to drive the data. The data is then transmitted to point A, wherein the data is transmitted to the first pad 114. Preferably, both the first and second output buffers 112, 118 provide equivalent delay to the clock signal and data respectively. As would be appreciated by one of reasonable skill in the art, equivalent delay may be provided by the first and second output buffers 112, 118 by specifying similar delay parameters during fabrication of the source chip 102. Further describing the transmission of the delayed clock signal and data, the delayed clock signal and data are then transmitted from the first pad 114, to a second pad 120, via the PCB route 119. A first input buffer 122, located within the destination chip 104, then receives the delayed clock signal from the second pad 120. This first input buffer 122 provides unigain amplification of the delayed clock signal, in addition to adding further delay to the original clock signal derived from the source chip 102. After further delayed by the first input buffer 124, the clock signal is transmitted to a destination CPU 123.

A second input buffer 124, located within the destination device 104, receives the transmitted data from the second pad 120 and, after buffering the data, transmits the data to a local memory element 126 located within the destination chip 104.

Figure 2:
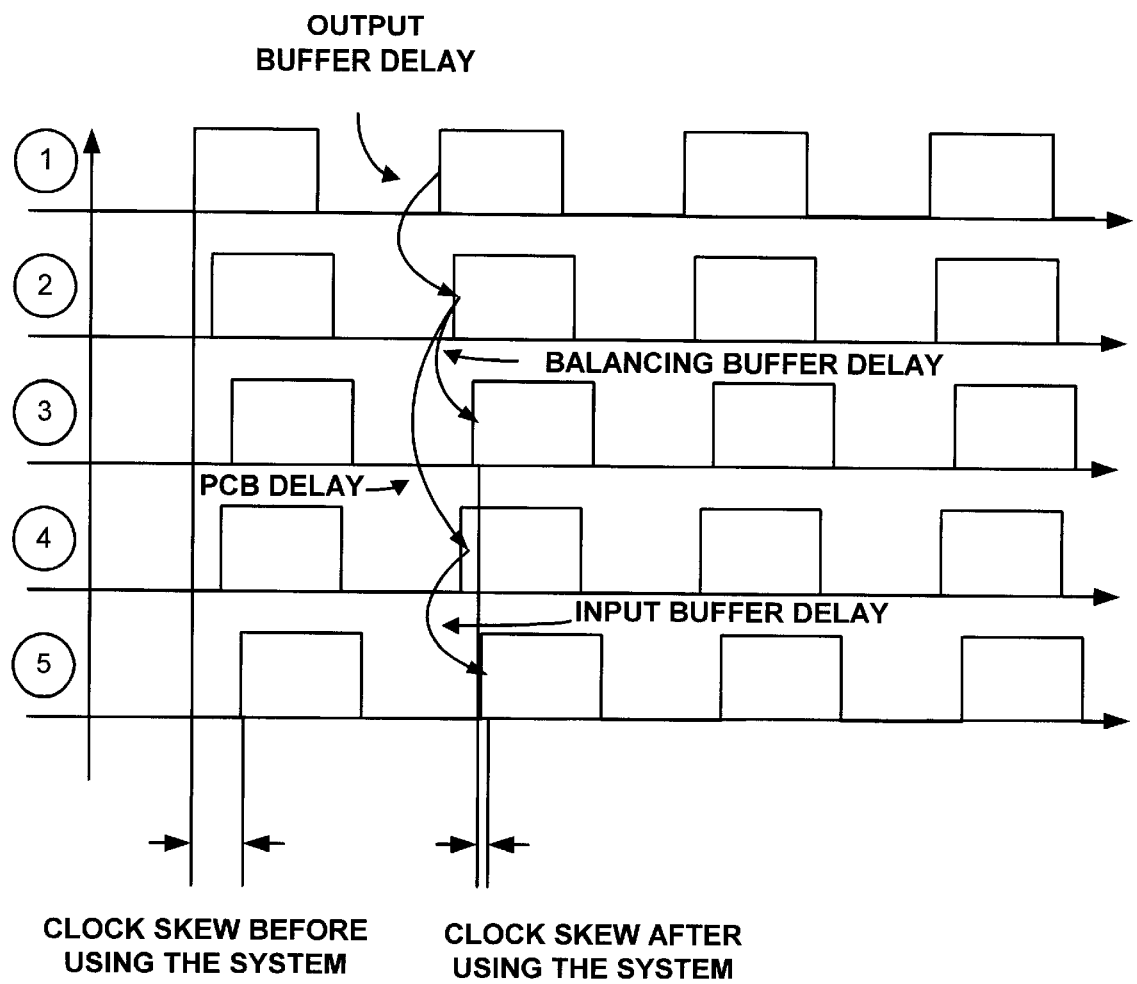
FIG. 2 illustrates timing delay factors as recognized by the system of FIG. 1.

The further delayed clock signal, which is then used by the destination chip 104 for purposes such as, but not limited to, the sampling of the received data, consists of a clock skew as shown by the difference in the rising edge of wave forms 1 and 5 located in FIG. 2. Further illustrating FIG. 2, wave forms 1 and 2 demonstrate output buffer delay, wave forms 2 and 3 demonstrate balancing buffer delay, waveforms 2 and 4 demonstrate PCB delay, and wave forms 4 and 5 demonstrate input buffer delay.

In order to minimize this clock skew, the delayed clock signal, which has previously been transmitted to the balancing buffer 116 located in the source chip 102, after being driven by the first output buffer 112, is then buffered by the balancing buffer 116. The balancing buffer 116 provides a balancing delay to the delayed clock signal, producing a balanced clock signal, wherein the balancing delay is directly related to the delay provided to the delayed clock signal, from the first input buffer 122 located in the destination chip 104. This balanced clock signal is then used by the source chip 102 for the previously mentioned production of data, such that the production of data is performed at a substantially similar phase as is the sampling of such data by the destination chip 104.

It should be noted that with the addition of additional destination chips, which receive the clock signal derived by the source chip 102, the amount of delay required by the balancing buffer 116 does not change, since the balancing buffer 116 compensates for the delay provided by the first input buffer 122, located in the destination chip 104. Alternatively, the delay provided by the first output buffer 112 increases with an increase in the number of destination chips requiring the clock signal derived by the source chip 102.

It should be emphasized that the above-described embodiments of the present invention, particularly, any "preferred" embodiments are merely possible examples of implementations, merely set forth for a clear understanding of the principles of the invention. Many variations and modifications may be made to the above-described embodiment(s) without departing substantially from the spirit and principles of the invention. All such modifications and variations are intended to be included herein within the scope of the present invention and protected by the following claims.

What is claimed is:

1. A system for balancing clock distribution between a first device and a second device, comprising:
    an output buffer, located in said first device, for driving a clock signal from said first device, to said second device, thereby creating a delayed clock signal;
    a second output buffer, located in said first device, for driving data from said first device, to said second device;
    an input buffer, located in said second device, for driving said delayed clock signal, received from said first device;
    a second input buffer, located in said second device, for driving said data to a memory device located on said second device; and
    a balancing buffer, located in said first device, for balancing said delayed clock signal in accordance with the delay provided by said input buffer, located in said second device, producing a balanced clock signal, wherein said balanced clock signal is used by said first device.

2. The system of claim 1, wherein said first device and said second device are integrated circuits.

3. The system of claim 1, wherein said first device produces said clock signal.

4. The system of claim 1, wherein said first device receives said clock signal from a clock generator located external to said first device.

5. The system of claim 1, wherein said data is produced by said first device.

6. The system of claim 1, wherein said data is produced by a device located external to said first device.

7. A method of balancing clock distribution between a first device and a second device, comprising the steps of:
    driving a clock signal from said first device, to said second device, thereby creating a delayed clock signal;
    further driving said delayed clock signal internal to said second device, thereby providing an additional delay to said delayed clock signal;
    balancing said delayed clock signal, in said first device, in accordance with said additional delay, thereby producing a balanced clock signal; and using said balanced clock signal internal to said first device.

8. The system of claim 7, wherein said first device produces said clock signal.

9. The system of claim 7, wherein said first device receives said clock signal from a clock generator located external to said first device.

10. The system of claim 7, wherein said step of driving a clock signal is performed by an output buffer located in said first device.

11. The system of claim 7, wherein said step of further driving said delayed clock signal is performed by an input buffer located in said second device.

12. The system of claim 7, wherein said step of balancing said delayed clock signal is performed by a balancing buffer located in said first device.

13. A system for balancing clock distribution between a first device and a second device, comprising:
    means for driving a clock signal from said first device, to said second device, thereby creating a delayed clock signal;
    means for driving said delayed clock signal in said second device, received from said first device;
    means for driving data from said first device, to said second device
    means for driving said data to a memory device located on said second device, wherein said means of driving said data is located in said second device; and
    means for balancing said delayed clock signal in said first device in accordance with a delay provided by said means for driving said delayed clock signal.

14. The system of claim 13, wherein said first device and said second device are integrated circuits.

15. The system of claim 13, wherein said first device produces said clock signal.

16. The system of claim 13, wherein said first device receives said clock signal from a clock generator located external to said first device.

17. The system of claim 13, wherein said data is produced by said first device.

18. The system of claim 13, wherein said data is produced by a device located external to said first device.

19. A system for balancing clock distribution between a first device and a second device, comprising:
    a clock driver, located in said device, for driving a clock signal from said first device, to said second device, wherein the signal received by the second device is a delayed clock signal, the delayed clock signal embodying a delay from the first buffer as well as a delay across a transmission medium; and a balancing buffer, located in said first device, the balancing buffer configured to regenerate a clock signal for use by components in the first device, wherein the balancing buffer is configured to delay the regenerated clock signal by an amount substantially equal to a sum of the delay across the transmission medium and a delay introduced by receiver components in the second device.

* * * * *